(12) United States Patent
Ambros et al.

(10) Patent No.: US 6,957,689 B2
(45) Date of Patent: Oct. 25, 2005

(54) HEAT EXCHANGER ARRANGEMENT PARTICULARLY FOR MOTOR VEHICLE

(75) Inventors: Peter Ambros, Kornwestheim (DE); Peter Griesheimer, Stuttgart (DE); Reinhard Kull, Ludwigsburg (DE); Eberhard Pantow, Stuttgart (DE)

(73) Assignee: BEHR GmbH & CO., Stuttgart (DE)

( * ) Notice: Subject to any disclaimer, the term of this patent is extended or adjusted under 35 U.S.C. 154(b) by 0 days.

(21) Appl. No.: 10/307,584

(22) Filed: Dec. 2, 2002

(65) Prior Publication Data

US 2003/0106669 A1 Jun. 12, 2003

Related U.S. Application Data

(62) Division of application No. 09/350,105, filed on Jul. 9, 1999, now Pat. No. 6,619,379.

(30) Foreign Application Priority Data

Jul. 9, 1998 (DE) .......................................... 198 30 677

(51) Int. Cl.[7] .............................. F01P 3/20; F01P 3/18; F28D 1/00; F28D 1/04
(52) U.S. Cl. ......................... 165/41; 165/51; 165/140; 165/903; 165/146; 123/563; 123/41.49; 123/41.31; 60/599
(58) Field of Search ................................ 165/903, 146, 165/140, 179, 41, 51; 123/563, 41.49, 41.31; 60/599; 180/68.4

(56) References Cited

U.S. PATENT DOCUMENTS

| | | |
|---|---|---|
| 4,138,857 A | 2/1979 | Dankowski |
| 4,176,630 A | 12/1979 | Elmer |
| 4,485,624 A | 12/1984 | Melchior |
| 4,620,509 A | 11/1986 | Crofts |

| | | | |
|---|---|---|---|
| 6,619,379 B1 | * | 9/2003 | Ambros et al. ................ 165/41 |

FOREIGN PATENT DOCUMENTS

| | | |
|---|---|---|
| DE | 31 36 673 A1 | 5/1982 |
| DE | 34 27 161 A1 | 1/1985 |
| DE | 198 13 069 A1 | 9/1999 |

(Continued)

OTHER PUBLICATIONS

Jenz et al., "Die Ladeluftkuhlung im Kraftfahrzeug., Charge–Air Cooling in Motor Vehicles," ATZ Automobiltechnische Zeitschrift 83, 1981, 9, pp 449, 450, 453.

Saur et al., "Kennfeldgesteuertes Temperaturregelsystem fur Motorkuhikreislaufe,": MTZ Motortechnische Zeitschrift 57, 1996, 7/8, pp 424–428.

Eitel, V. Jochen, "Ladeluftkhlung mit niedertemperatur— Kuhlmittelkreislaufen fur Kraffahrzeug—Verbrennungsmotoren," MTZ Motortechnische Zeitschrift 53, 1992, S. pp 114–121.

(Continued)

*Primary Examiner*—John K. Ford
(74) *Attorney, Agent, or Firm*—Foley & Lardner LLP

(57) ABSTRACT

A heat exchange arrangement for a vehicle has at least two heat exchangers exposed to the action of ambient air. One of the heat exchanger is coolant cooler and the other one is a charge-air coolant. Each of these coolers has tubes through which liquid or gas flows and heat dissipating ribs connected to the tubes. The coolant cooler is positioned upstream of the charge-air cooler in the air-flow direction. The charge-air cooler has an overlapping region in which the coolant cooler and the charge-air cooler overlap one another and a non-overlapping region in which the coolant cooler projects substantially perpendicularly to the cooling air flow direction. The non-overlapping region is formed at least in the charge-air outlet region and is cooled directly by ambient cooling air. The overlapping region is cooled by the ambient cooling air that has passed through the coolant cooler, which is positioned immediately upstream of the overlapping region of the charge-air cooler.

6 Claims, 5 Drawing Sheets

FOREIGN PATENT DOCUMENTS

| | | |
|---|---|---|
| EP | 0 522 288 A1 | 1/1993 |
| EP | 0 522 471 A1 | 1/1993 |
| GB | 2 113 819 A | 8/1983 |
| GB | 2 262 600 A | 6/1993 |
| JP | 54-100132 A | 8/1979 |
| JP | 63-34489 A | 2/1988 |
| JP | 2-259394 A | 10/1990 |
| JP | 2-271030 A | 11/1990 |
| JP | 4-187992 A | 7/1992 |
| JP | 4-314914 A | 11/1992 |
| JP | 4-316930 A | 11/1992 |
| JP | 5-10125 A | 1/1993 |
| JP | 6-50144 A | 2/1994 |
| JP | 7-189684 A | 7/1995 |

OTHER PUBLICATIONS

Jenz, V. S., "Entwicklungen in der Nutzfahrzeug—Motorkuhlung," MTZ Motortechnische Zeitschrift 54, 1993, 10, pp 534–539.

Japanese Patent Abstract of Japan: 4–314914 A., M–1384, Mar. 19, 1993, vol. 17, No. 136.

* cited by examiner

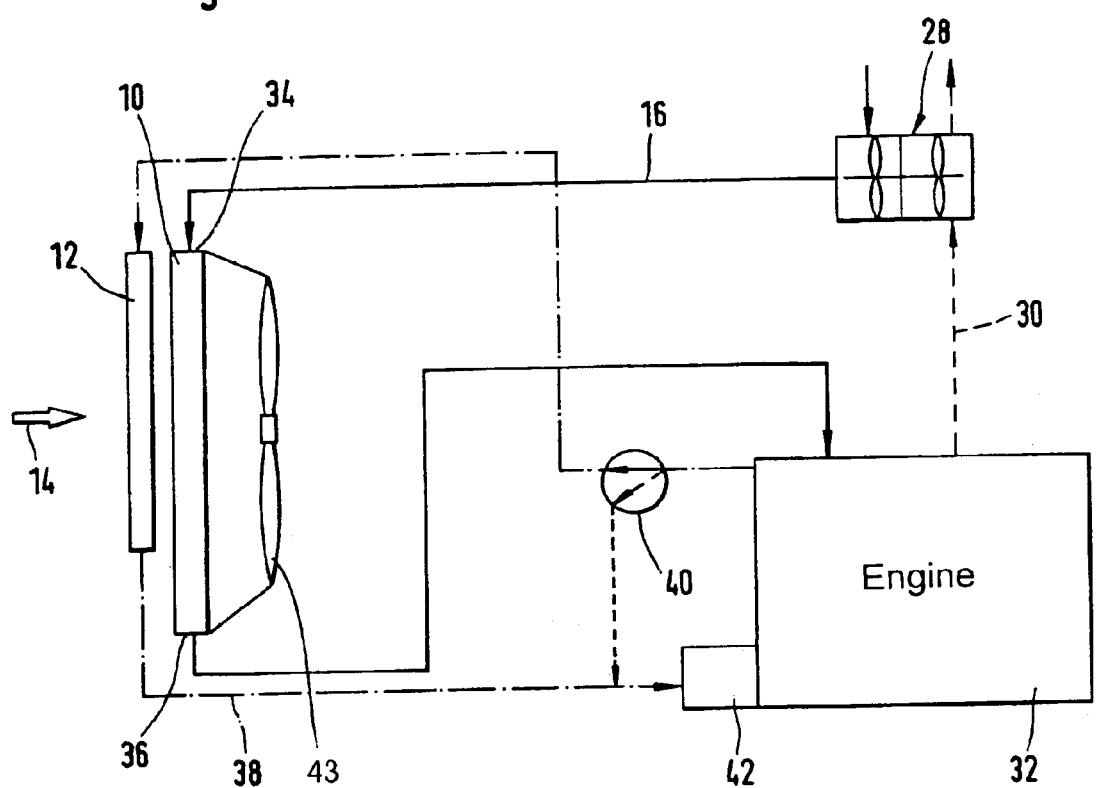

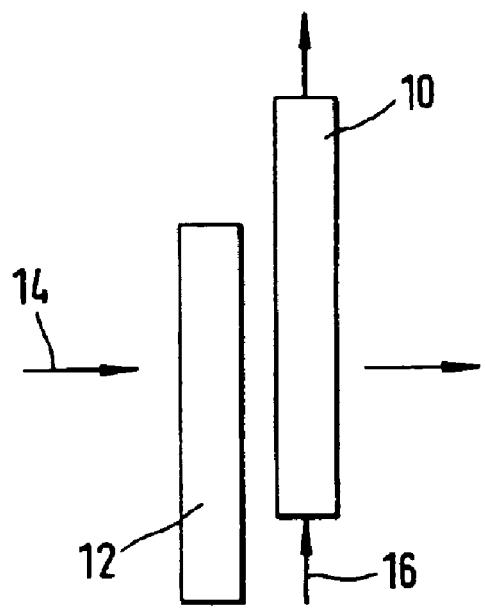
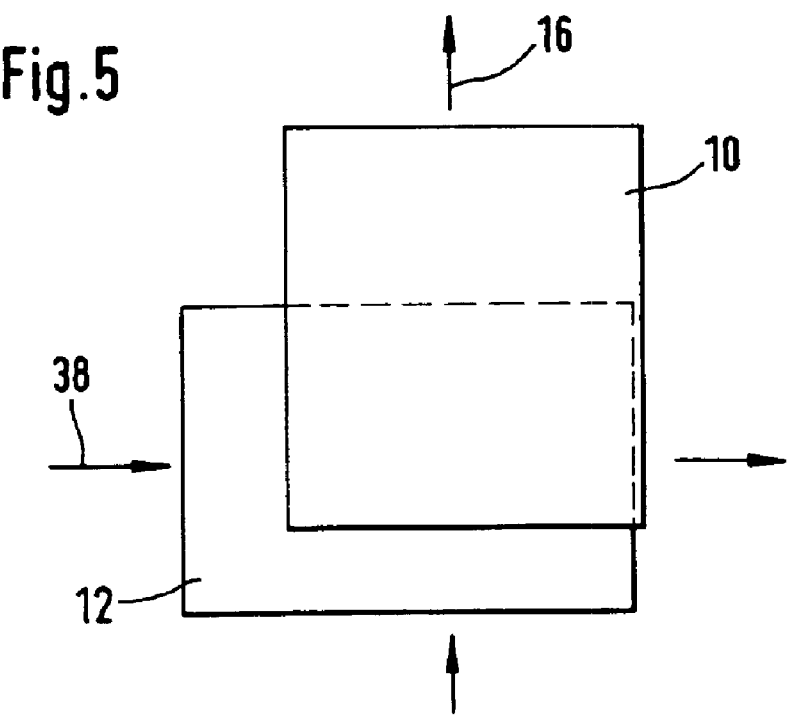

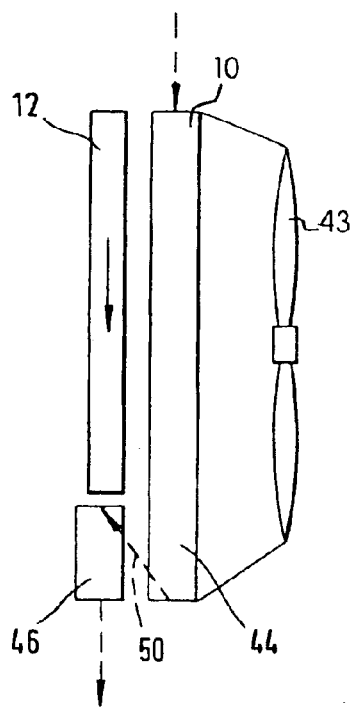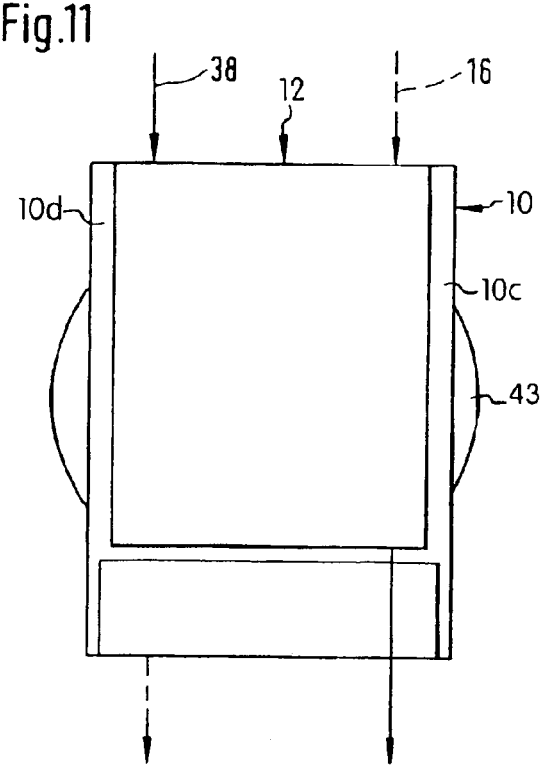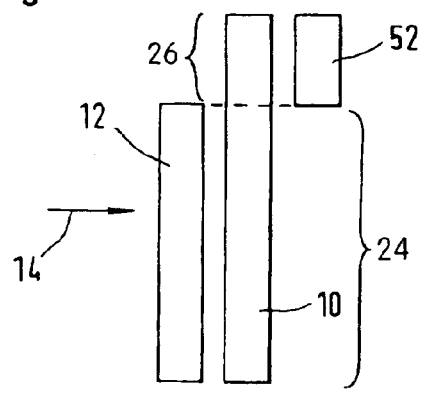

HEAT EXCHANGER ARRANGEMENT PARTICULARLY FOR MOTOR VEHICLE

This is a Division Application of Ser. No. 09/350,105, filed Jul. 9, 1999 now U.S. Pat. No. 6,619,379, which is herein incorporated by reference in its entirety.

BACKGROUND

A coolant cooler dissipates excess heat produced by an internal combustion engine of a motor vehicle to ambient air. Moreover, with supercharged internal combustion engines, a charge-air cooler cools air, which has been heated and compressed in a supercharger, and dissipates heat to ambient air. The operations of cooling charge air and coolant are fundamentally different. The coolant undergoes only a small drop in temperature because the coolant has a high heat capacity. A large heat quantity thus can be exchanged even with slight cooling. In contrast, the charge air temperature is considerably higher when it enters the charge-air cooler and has to be considerably lower than that of the coolant as the charge air exits.

Charge-air coolers can be air cooled or liquid cooled. In liquid-cooled charge-air coolers, more straightforward charge-air guidance is usually possible, and the overall volume of these charge-air coolers can be smaller than the air-cooled design. If the engine coolant cools the charge air, the charge air can only be cooled approximately to the coolant temperature. If a lower charge-air temperature is sought, it can only be achieved by an additional coolant circuit that is capable of producing a lower outlet temperature or, more straightforwardly, by air-cooled charge-air coolers. The air-cooled design is widely used in passenger cars and commercial vehicles. The charge-air coolers are thus generally air-cooled charge-air coolers.

It is known from the publication ATZ Automobiltechnische Zeitschrift (Automotive Journal) (1981), No. 9, pages 449, 450, 453, to arrange the charge-air coolers upstream of the coolant cooler and have part of the end surface of the coolant cooler overlap the charge-air cooler on the air side. The reason for this arrangement is that, in the case of the charge-air cooler, a lower target temperature has to be reached than in the case of the coolant cooler. The lower target temperature is ensured by cooling with fresh air flowing against the same. This conventional arrangement is disadvantageous in that cooling air flowing on the air side becomes heated to a very pronounced extent in the upstream charge-air cooler. Because the heated air reaches the downstream coolant cooler, it can only slightly cool the coolant in the overlapping coolant-cooler part. The coolant cooler of such an arrangement thus requires a relatively large surface area to achieve the necessary cooling capacity. Moreover, very large cooling-air streams are necessary, and they require in some cases very high fan capacities.

European Patent Application EP 522 288 discloses a heat exchanger arrangement that has a coolant cooler and a charge-air cooler. The charge-air cooler is of split design and, in relation to a cooling air stream, has one charge-air-cooler part located upstream of the coolant cooler and one charge-air-cooler part located downstream thereof. This arrangement makes it possible for at least one part-surface of both of the charge-air cooler and of the coolant cooler to be exposed to fresh air. Such an arrangement has a disadvantage in that, on account of the charge-air cooler being split into two charge-air-cooler parts, increased design outlay is necessary, in particular in terms of the charge-air-side connection of the two charge-air-cooler parts to one another for passing on the charger from one charge-air-cooler part to the other. Because this operation involves the charge air being passed on, there is an additional pressure drop in the charge air. Furthermore, there is an increase in the installation space, in particular the installation depth in the air-flow direction within the motor vehicle in comparison with a conventional arrangement, since three heat-exchanger planes, namely the first part of the charge-air cooler, the coolant cooler, and the second part of the charge-air cooler, are arranged one behind the other on the air side.

European Patent Application EP 522 471 discloses a heat exchanger arrangement that has a coolant cooler and a charge-air cooler. Both the coolant cooler and the charge-air cooler are of split design. This arrangement likewise is disadvantageous in that increased design outlay is necessary for passing on the charge air and the coolant to the respectively associated charge-air-cooler part and coolant-cooler part.

SUMMARY OF THE INVENTION

The present invention relates to a heat exchanger arrangement that can reduce the design outlay. Furthermore, the installation space, both in terms of the depth in the air-flow direction and perpendicularly thereto, can be kept as low as possible, to achieve the greatest possible heat-exchanging capacity over a smallest possible surface area.

A heat exchanger arrangement according to the present invention can comprise a coolant cooler and a charge-air cooler. Both the coolant cooler and the charge-air cooler are exposed to ambient air. The coolant cooler comprises a plurality of tubes through which coolant to be cooled flows and heat dissipating ribs connected to the tubes. The charge-air cooler similarly comprises a plurality of tubes through which hot charge air to be cooled flows and heat dissipating ribs connected to the tubes. The charge-air cooler has a charge-air inlet region from which hot charge air is introduced into the charge-air cooler and a charge-air outlet region from which cooled charge air exits.

According the present invention, the charge-air cooler is positioned downstream of the coolant cooler relative to the direction of cooling air flow. The charge-air cooler has an overlapping region in which the coolant cooler and the charge-air cooler overlap one another and a non-overlapping region in which a portion of the charge-air cooler projects substantially perpendicularly to the cooling air flow direction, beyond the coolant cooler. The non-overlapping region is formed at least in the charge-air outlet region and is cooled directly by ambient cooling air, whereas the overlapping region is cooled by the ambient cooling air that cools the coolant cooler.

The surface area of the charge-air cooler can be smaller or substantially the same, or larger than that of the coolant cooler. The charge-air cooler and the coolant cooler can be offset with respect to one another perpendicularly to the air-flow direction.

The density of the ribs of the charge-air cooler can be greater in the non-overlapping region than in the overlapping region. The density of the ribs and/or the mutual spacing of the ribs on the outer surface and/or the interior of the charge-air cooler can be varied. The spacing between the tubes of the charge-air cooler can be smaller in the non-overlapping region than in the overlapping region. The charge-air cooler can have a multiple rows of tubes, with a greater number of tube rows in the non-overlapping region than in the overlapping region. The non-overlapping region of the charge-air cooler can also have a greater depth in the air-flow direction than the overlapping region.

According to another aspect of the invention, at least one additional heat exchanger is arranged upstream of and at least partially overlaps the non-overlapping region of the charge-air cooler. The additional heat exchanger can be connected downstream of the charge-air outlet region to further cool the charge air. The additional heat exchanger can also be integrated with at least one of the charge-air exchanger and coolant cooler and the additional heat exchanger can be arranged upstream, downstream or alongside thereof.

The additional heat exchanger is adapted to be connected to a coolant circuit that is separate from the charge-air cooler and the coolant cooler, such as an exhaust-gas cooling circuit, or that is part of the charge-air or coolant cooling circuit. Thus, the additional heat exchanger can be an exhaust-gas heat exchanger.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

FIG. 3 shows a schematic view of the arrangement of a charge-air cooler and a coolant cooler in the charge-air circuit and the coolant circuit.

FIG. 4 shows a side view of a configuration of the arrangement according to the invention of a coolant cooler and a charge-air cooler.

FIG. 5 shows a front view of a further configuration of the arrangement according to the invention of a coolant cooler and a charge-air cooler.

FIG. 10 shows a schematic side view of a further configuration of the invention with a further heat exchanger.

FIG. 11 shows a front view of FIG. 10.

FIG. 12 shows a schematic side view of a further configuration of the invention with a further heat exchanger.

DETAILED DESCRIPTION OF THE PREFERRED EMBODIMENTS

Figure 1:
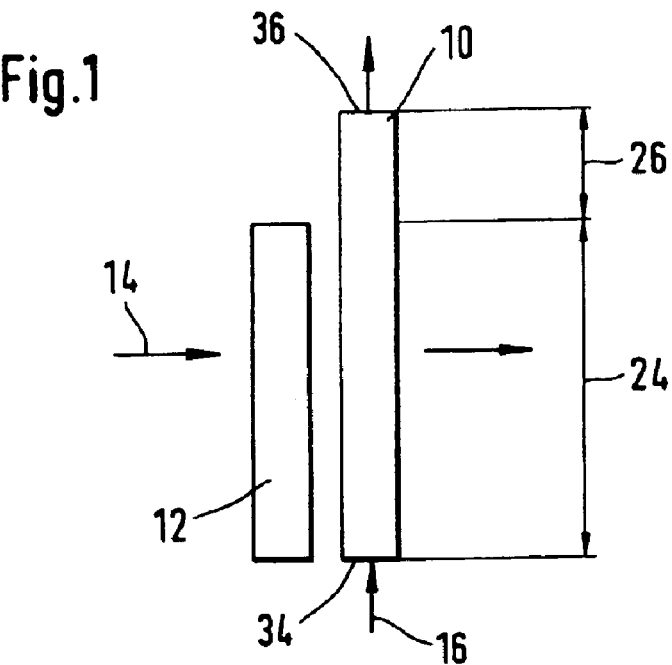
FIG. 1 shows a schematic side view of an arrangement of a coolant cooler and a charge-air cooler.

FIG. 1 shows two heat exchangers in the form of a charge-air cooler 10 and of a coolant cooler 12, which are installed in an engine compartment (not illustrated) of a motor vehicle. Each of these coolers comprises a plurality of tubes through which either liquid or gas flows, and heat dissipating ribs connected to the tubes. The two heat exchangers are exposed to a cooling-air stream 14 on the air side and are serially arranged. The coolant cooler 12 is located, on the air side, upstream of the charge-air cooler 10. In this embodiment, the coolant cooler 12 has a smaller cooling surface than the charge-air cooler 10.

Figure 2:
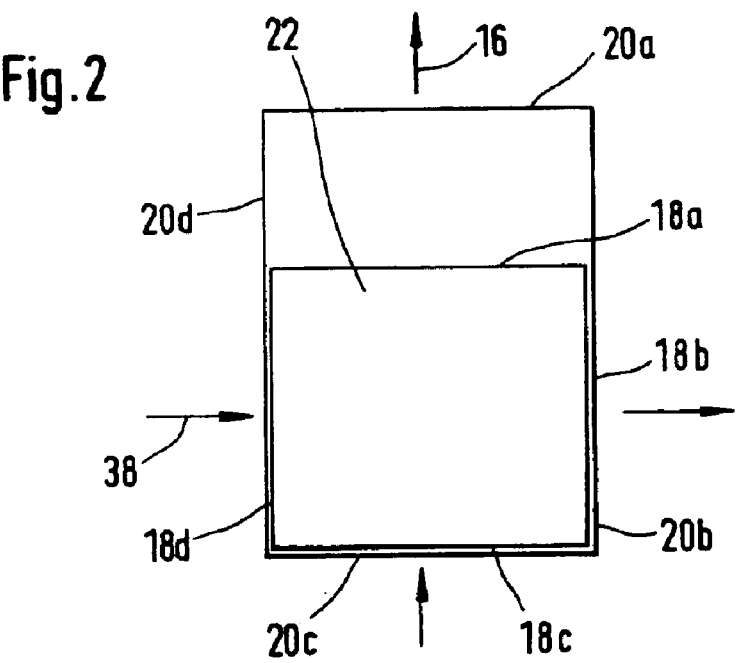
FIG. 2 shows a front view of the arrangement of FIG. 1.

FIG. 2 shows termination edges 18b, 18c, and 18d of the coolant cooler 12, which are arranged essentially parallel to the termination edges 20b, 20c, and 20d of the charge-air cooler 10 and are positioned essentially in alignment therewith in the air-flow direction of the cooling-air stream 14. The coolant cooler 12 thus overlaps an end-surface region 24 of the charge-air cooler 10 by way of its entire end surface 22. Thus, only an end-surface region 26 of the charge-air cooler 10, which region is located between the termination edges 20a and 18a, is not overlapped on the air side and is thus subjected to the direct cooling-air stream 14 flowing freely against it.

On the charge-air side, the charge-air cooler 10 has a charge-air stream 16 flowing through it. The stream, as shown in FIG. 3, is incorporated in a charge-air circuit between an internal combustion engine 32 and the charge-air cooler 10. In this case, the charge-air circuit is compressed by a compressor 28, which is driven by an exhaust-gas air stream 30 of the internal combustion engine 32, and fed through the charge-air cooler 10 of the internal combustion engine 32. The charge-air cooler 10 cools the charge air exhausting from the exhaust-gas air stream, which is compressed by the compressor 28. The charge air enters the charge-air cooler 10 from a charge-air inlet side 34 at approximately 200° K above the ambient temperature. The charge-air exits the cooler 10 from a charge-air outlet region 36 at approximately 20° K above the temperature of the ambient air.

According to the embodiment of FIG. 3, the coolant cooler 12 is incorporated on the coolant side, in a coolant stream 38, where the coolant from the internal combustion engine 32 circulates through a control valve 40, the coolant cooler 12, and back to the internal combustion engine 32. The coolant cooler 12 cools the coolant heated by the internal combustion engine 32. The heated coolant is introduced into the coolant cooler 12 at a temperature of approximately 70° K above the ambient temperature. The temperature drop due to heat dissipation is in the range of a few degrees Kelvin. The coolant stream 38 is driven by a coolant pump 42.

To assist the flow of the cooling-air stream of the ambient air through both the coolant cooler 12 and the charge-air cooler 10, a fan 43 is arranged, on the air side, downstream of the heat exchangers 12, 10.

The features of the present invention reside in the sequence in which the coolant cooler 12 and the charge-air cooler 10 are arranged in the cooling-air stream, and the overlap configuration. Since the coolant cooler 12 according to FIG. 1 precedes before any other heat exchanger, ambient cooling air, i.e., non-preheated cooling-air stream 14, can flow directly against it and take advantage of the maximum heat dissipating capability of the ambient cooling air stream.

The charge-air cooler 10 according to FIG. 1 is positioned immediately downstream of the coolant cooler 12, which has a smaller dimension than the charge-air cooler 10. Thus, a portion of the charge-air cooler 10 overlaps the coolant cooler 12. Specifically, the upper portion of the charge-air cooler extending below from the charge-air inlet side 34 forms an overlapping region. The overlapping region of the charge-air cooler thus receives cooling air 14 that has passed through the coolant cooler 12 and thus preheated by the coolant cooler 12. The temperature difference between the charge air flowing through the interior of the charge-air cooler and the cooling air 14 that acts on the charge-air cooler 10 from the outside, becomes smaller than had the ambient cooling air 14 flowing directly against the charge-air cooler. Since the charge-air, however, enters into the charge-air cooler 10 at approximately 200° K above the ambient temperature and the cooling air is only preheated to around 70° K above the ambient air temperature, there is still a large temperature difference between the preheated cooling-air stream 14 reaching the charge-air cooler and the charge air. This temperature difference is sufficient for the cooling air to dissipate heat from the charge air and lower the charge air temperature to about 70° K above the ambient air temperature.

Since the target temperature of the charge air flowing out of the charge-air outlet region 36 is approximately 20° K above the ambient air temperature, it would not always be possible to cool the charge air to the target temperature using only the cooling air 14 preheated by the coolant cooler 12. According to the invention, the charge-air cooler 10 has a second portion projecting beyond the first or overlapping region 24 to further reduce the temperature of the charge air to the desired target temperature by blowing ambient cooling air 14, which is not preheated, directly against the second or non-overlapping region 26.

The essential factor here is that the non-overlapping region 26, where the charge air is finally brought to the target temperature, is arranged, downstream of the first region 24 in the charge air flow direction, to make it possible to fully utilize the above-mentioned advantages of the temperature differences. The direction in which the coolant is delivered by the coolant cooler 12 plays a lesser role in comparison with the direction of the charge-air stream. Moreover, in the present example, FIG. 1 illustrates a situation where the coolant stream 38 flows horizontally from left to right through the coolant cooler 12. Alternatively, flow may also take place from right to left, from top to bottom or, conversely, from bottom to top. Moreover, the non-overlapping region 26, which is provided in the top region of the arrangement in the installed position in FIG. 1, may also alternatively be arranged, depending on individual requirements, in the bottom region. A lateral arrangement of the non-overlapping region 26 is likewise conceivable.

FIG. 4 shows a different way of forming overlapping and non-overlapping regions. In this case, two heat exchangers, which in the installed position can have the same height or of different heights, are offset heightwise with respect to one another so that a region that has air flowing directly against it also is formed in the upper region. Analogously, it is likewise possible for heat exchangers of the same width or of different widths to be offset in the lateral direction, as is illustrated in FIG. 5. Such an arrangement assists the installation in vehicle regions that do not have a rectangular installation opening.

Figure 6:
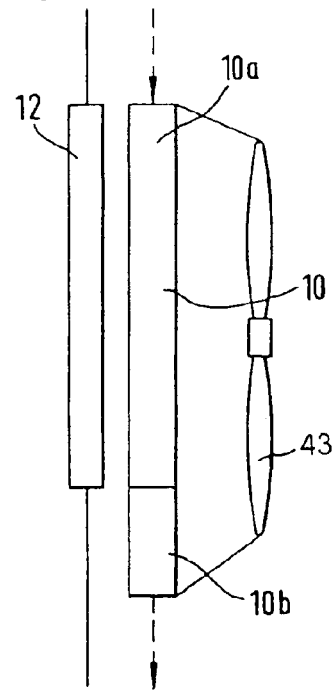
FIG. 6 shows a schematic side view of a further configuration of the invention with a varying rib density.
Figure 7:
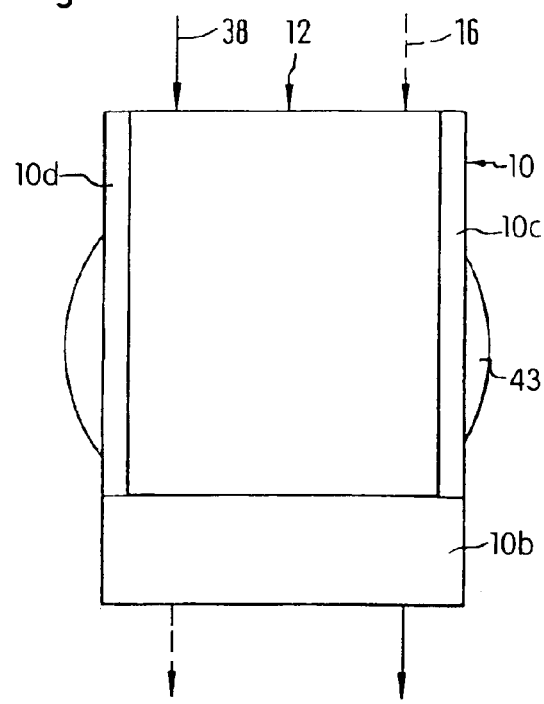
FIG. 7 shows a front view of FIG. 6.

A further improvement in the heat-exchanging capacity of the arrangement as a whole can be achieved by increasing the density of the heat dissipating ribs of the charge-air cooler in the non-overlapping region 26 and/or reducing the density of the ribs in the overlapping region 24. Alternatively, the density of the ribs of the coolant cooler can be coordinated in certain regions or in full. FIGS. 6 and 7 show such an arrangement where the charge-air cooler 10 has an overlapping region 10a and non-overlapping region 10b, 10c, and 10d. The non-overlapping region 10b has a greater rib density than that of the overlapping region 10a. The non-overlapping regions 10c and 10d, which are subjected to direct cooling-air stream 14, can also have the same density as the overlapping region 10a. The density of the ribs can be adapted in each case to optimize the heat-exchanging capacity. Also, the density of the ribs and/or the mutual spacing of the ribs on the outer surface and/or the interior of the charge-air cooler can also be varied.

Figure 8:
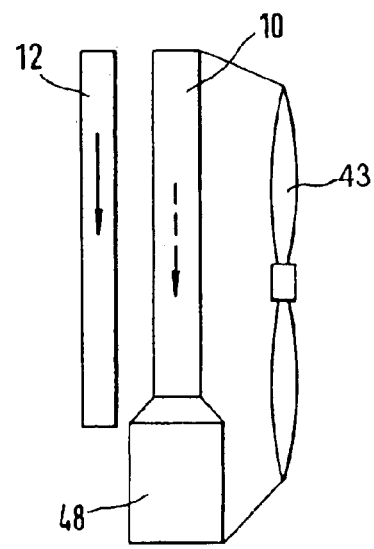
FIG. 8 shows a schematic side view of a further configuration of the invention with a varied depth of the charge-air cooler.
Figure 9:
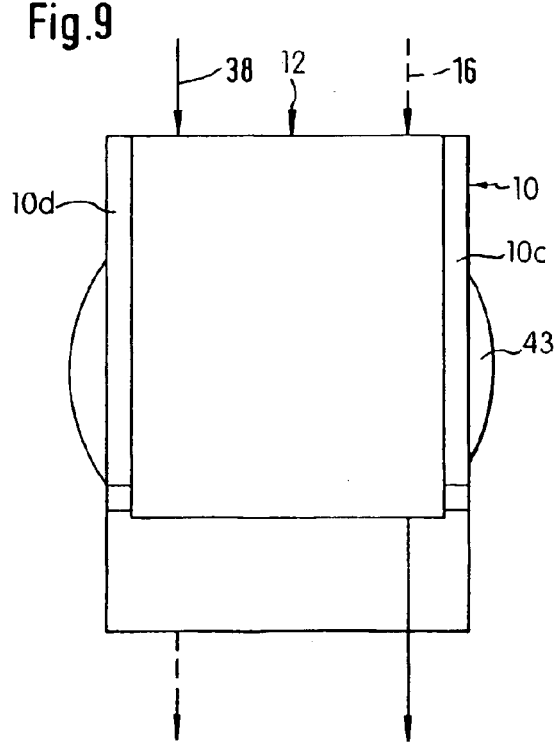
FIG. 9 shows a front view of FIG. 8.

A similar effect can be achieved by increasing the depth of the non-overlapping region 48 of the charge-air cooler 10, as shown in FIGS. 8 and 9. Alternatively, in the case of a multi-row design, similar results can be obtained by increasing the number of tube rows.

In another embodiment, as shown in FIGS. 10 and 11, the charge-air cooler 10 can be a two-part design having a charge-air-cooler part 44 and a low-temperature charge-air-cooler part 46 connected in series, on the air side, upstream of the charge-air-cooler part 44. In this case, the low-temperature charge-air-cooler part 46 can be arranged parallel to the single-part coolant cooler 12. The charge-air-cooler-part 44 and the low temperature charge-air-cooler part 46 are connected in series on the charge-air side. Thus, the charge air is first directed through the charge-air-cooler part 44 and then is fed to the low-temperature charge-air cooler part 46 via connecting lines 50. This further improves the heat-exchanging capacity with just two heat-exchanging planes, namely a first plane having the coolant cooler 12 and the low-temperature charge-air-cooler part 46 and a second plane having the charge-air-cooler part 44.

FIG. 12 shows an arrangement of a coolant cooler 12, a charge-air cooler 10, and an additional heat exchanger 52 having a cooling-air stream 14 flowing through them. In this case, the additional heat exchanger 52 is arranged, on the air side, downstream of the coolant cooler 12 and the charge-air cooler 10, and is arranged behind the non-overlapping region 26 of the charge-air cooler 10.

The additional heat exchanger 52 may have the task of guiding a partial coolant stream that has been branched off from the main coolant circuit of the coolant cooler 12, or may be completely isolated therefrom. In the latter case, the additional heat exchanger 52 serves to cool an additional heat source, for example an exhaust-gas heat exchanger.

By situating the coolant cooler 12 upstream of the charge-air cooler 10 in the air-flow direction, and projecting the charge-air cooler 10 beyond the dimension of the coolant cooler 10 at least in the charge-air outlet region 36, so that a portion of the charge-air cooler overlaps the coolant cooler. Because the coolant cooler 12 is arranged upstream of the charge-air cooler 10, with at least the side on which the charge air is discharged from the charge-air cooler 10 is not overlapping with the coolant cooler, it is possible to use a considerably smaller coolant cooler than in the case of the conventional arrangement. By virtue of the present arrangement, the temperature of the cooling-air stream that has been preheated by the coolant cooler is in each case much cooler than the temperature of the charge-air cooler arranged downstream on the air side. The target temperature of the charge-air cooler, which is lower than attainable from the preheated coolant cooler, is finally achieved by the non-overlapping portion of the charge-air cooler having the ambient air flowing directly against it.

It has surprisingly been found that, within the context of simulation calculations, in comparison with the conventional arrangement, the arrangement according to the invention, with equivalent charge-air cooling, allows the coolant temperature to be additionally reduced by approximately 5° K. In comparison with the conventional arrangement, the present arrangement, with the same heat-exchanging surface area, provides an improved heat-exchanging capacity or, with the same heat-exchanging capacity, alternatively needs less heat-exchanging surface area, saving space.

The charge-air cooler 10 can have a larger area than the coolant cooler 12. This makes it possible to form a region of the charge-air cooler that is not overlapping on the air side with the coolant cooler 12. That is, the two heat exchangers 10, 12 are arranged essentially in alignment one behind the other on up to three of the four sides on the air side, which efficiently uses the entire surface area for the heat exchange.

The charge-air cooler 10 and the coolant cooler 12 can be offset with respect to one another perpendicularly to the air-flow direction. Such an offset arrangement increases the surface area of the non-overlapping region(s) and makes it possible to have the coolant cooler 12 and charge-air cooler 10 to have the same size or area, or different sizes. In this case, such an offset arrangement may be effected in a horizontal and/or in a vertical direction in relation to the installed position in the motor vehicle, to assist the installation of the coolant cooler 12 and charge-air cooler 10 in non-rectangular installation space.

In a further configuration of the invention, the charge-air cooler 10 can have a smaller area than or the same area as the coolant cooler 12, with the two heat exchangers being offset with respect to one another perpendicularly to the air-flow direction. The charge-air cooler 10 is arranged downstream of the coolant cooler 12, and has a portion projecting beyond the coolant cooler 12 in the charge-air outlet region 36. This arrangement provides a region in which, on account of the smaller or the same area size, there is no overlapping of the end surfaces of the two heat exchangers. This type of arrangement is advantageous, in particular, when, for cooling the charge air, the heat-exchanging surface area required in the overlapping region is smaller than the end surface of the coolant cooler 12. This likewise achieves favorable utilization of the cooling-air stream and makes it being possible for the charge-air cooler 10 to be smaller in terms of its end surface, and thus less expensive.

The local density of the ribs of the charge-air cooler 10 can be greater in the non-overlapping region than in the overlapping region, as set forth analogously in the applicant's German patent application No. 198 13 069. This reduces any inhomogeneity in terms of the air speed between the overlapping and non-overlapping regions, and thus also an inhomogeneity in the heat exchange, and there is an increase in heat-exchange capacity of the arrangement as a whole. In this case, it is possible for both the air-side ribs, on the outer surface of the charge-air cooler, and also in addition, or as an alternative, for the charge-air-side ribs, in the interior of the charge-air cooler, to have their mutual spacing varied. It is not necessary, however, for the density and the degree of change in density of the inner and outer ribs to be the same. Preferably, however, with an increase in the rib density on the outside, an increase in the rib density on the inside will also be carried out. In comparison with the above-mentioned arrangement, which already provides advantages of its own, such a variation in the rib density achieves a further substantial improvement. Simulation calculations show that, in comparison with the conventional arrangement, the present arrangement, with equivalent charge-air cooling, allows the coolant temperature to be additionally reduced by approximately 10° K.

The spacing between the tubes (tube division) of the charge-air cooler can be smaller in the non-overlapping region than in the overlapping region. This likewise increases the heat-exchanging capacity and makes it possible for a variation in the spacing between the tubes of the charge-air cooler to take place both alone and in combination with a variation in the rib density.

In a further configuration of the invention, the charge-air cooler can have a plurality of rows of tubes located one behind the other on the air side, the number of non-overlapping regions of tube rows of the charge-air cooler being greater than that of the overlapping region. This likewise increases the heat-exchanging capacity of the arrangement, a combination with the above-mentioned possible variations being conceivable.

The depth of the charge-air cooler in the air-flow direction can be greater in the non-overlapping region than in the overlapping region. This makes it possible to vary the depth both in the direction of the air flow and in the direction counter to this, as well as in both directions. The above-mentioned advantages are also achieved by such a variation. Again, a combination with the above-mentioned possible variations is conceivable.

In a further configuration of the invention, at least one additional heat exchanger is arranged, on the air side, upstream of the non-overlapping region of the charge-air cooler. The additional heat exchanger overlaps at least partially the non-overlapping region of the charge-air cooler. The additional heat exchanger can project laterally beyond the end surfaces of the coolant cooler and/or charge-air cooler. The number of heat-exchanger planes is not increased by an additional heat exchanger arranged this way since it is incorporated in the existing plane. This heat exchanger may be, for example, a low-temperature heat exchanger intended for charge-air cooling and connected in series with the charge-air cooler on the charge-air side.

In another embodiment, at least one additional heat exchanger is arranged, on the air side, upstream or downstream of the heat exchangers 10, 12, or alongside the same. The additional heat exchanger can be integrated with the charge-air cooler or coolant cooler. This allows module formation from a number of heat exchangers. The additional heat exchanger may be, for example, a condenser or gas cooler belonging to an air-conditioning system and can overlap at least partially or project beyond the arrangement comprising the coolant cooler and the charge-air cooler. The additional heat exchanger may also be a subsidiary oil cooler or another heat exchanger exposed to the action of air.

The additional heat exchanger can be connected to a coolant circuit that is separate from the charge-air cooler and the coolant cooler, thus making it possible for the temperature level of the isolated coolant circuit to be coordinated individually.

In a further configuration of the invention, the further heat exchanger can be connected, along with the coolant cooler, to a common coolant circuit, making it possible for the additional heat exchanger to be designed as a low-temperature heat exchanger or as an exhaust-gas heat exchanger.

The present invention is used, in particular, in the field of commercial vehicles, but it can likewise be used in passenger cars and other engine operated machines in which both coolant coolers and charge-air coolers are used.

It is likewise possible for this invention to be combined with temperature-control systems within the context of thermo-management for cooling circuits, as described, for example, in the publication MTZ Motortechnische Zeitschrift (Engine Journal) (1996), No. 7/8, pages 424–428.

Although references are made in here to directions in describing the structure, they are made relative to the drawings (as normally viewed) for convenience. The directions, such as left, right, upper, lower, etc., are not intended to be taken literally or limit the present invention.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

We claim:

1. A heat exchanger arrangement comprising:
   a coolant cooler exposed to ambient air and comprising a plurality of tubes through which coolant to be cooled flows and beat dissipating ribs connected to the tubes;
   a charge-air cooler exposed to ambient air and comprising a plurality of tubes through which hot charge air flows and heat dissipating ribs connected to the tubes, the charge-air cooler having a charge-air inlet region from which hot charge air is introduced and a charge-air outlet region from which cooled charge air exits; and
   at least one additional heat exchanger,
   wherein the charge-air cooler is positioned downstream of the coolant cooler relative to a direction of cooling air flow,
   wherein the charge-air cooler has an overlapping region in which the coolant cooler and the charge-air cooler overlap one another and a non-overlapping region in which a portion of the charge-air cooler projects substantially perpendicularly to the cooling air flow direction, beyond the coolant cooler,
   wherein the non-overlapping region is formed at least in the charge-air outlet region and is cooled by ambient cooling air that does not pass through the coolant cooler,
   wherein the overlapping region is cooled by ambient cooling air that cools the coolant cooler,
   wherein the charge-air cooler has multiple rows of the tubes, with a greater number of tube rows in the non-overlapping region than in the overlapping region, and
   wherein said at least one additional heat exchanger is integrated with at least one of the charge-air cooler and coolant cooler and arranged upstream, downstream, or alongside thereof.

2. A heat exchanger arrangement comprising:
   a coolant cooler exposed to ambient air and comprising a plurality of tubes through which coolant to be cooled flows and heat dissipating ribs connected to the tubes;
   a charge-air cooler exposed to ambient air and comprising a plurality of tubes through which hot charge air flows and heat dissipating ribs connected to the tubes, the charge-air cooler having a charge-air inlet region from which hot charge air is introduced and a charge-air outlet region from which cooled charge air exits; and
   at least one additional heat exchanger,
   wherein the charge-air cooler is positioned downstream of the coolant cooler relative to a direction of cooling air flow,
   wherein the charge-air cooler has an overlapping region in which the coolant cooler and the charge-air cooler overlap one another and a non-overlapping region in which a portion of the charge-air cooler projects substantially perpendicularly to the cooling air flow direction, beyond the coolant cooler,
   wherein the non-overlapping region is formed at least in the charge-air outlet region and is cooled by ambient cooling air that does not pass through the coolant cooler,
   wherein the overlapping region is cooled by ambient cooling air that cools the coolant cooler,
   wherein said at least one additional heat exchanger is arranged upstream of and at least partially overlapping the non-overlapping region of the charge-air cooler, and
   wherein the additional heat exchanger is connected downstream of the charge-air outlet region to further cool the charge air.

3. A heat exchanger arrangement comprising:
   a coolant cooler exposed to ambient air and comprising a plurality of tubes through which coolant to be cooled flows and heat dissipating ribs connected to the tubes; and
   a charge-air cooler exposed to ambient air and comprising a plurality of tubes through which hot charge air flows and heat dissipating ribs connected to the tubes, the charge-air cooler having a charge-air inlet region from which hot charge air is introduced and a charge-air outlet region from which cooled charge air exits, the charge air cooler having a first charge-air cooler part and a second charge-air cooler part;
   wherein the first charge-air cooler part is positioned downstream of the coolant cooler relative to a direction of cooling air flow,
   wherein the first charge-air cooler part has an overlapping region in which the coolant cooler and the first charge-air cooler part overlap one another and a non-overlapping region in which a portion of the first charge-air cooler part projects substantially perpendicularly to the cooling air flow direction, beyond the coolant cooler,
   wherein the non-overlapping region is formed at least in the charge-air outlet region and is cooled by ambient cooling air that does not pass through the coolant cooler,
   wherein the overlapping region is cooled by ambient cooling air that cools the coolant cooler,
   wherein the second charge-air cooler part is arranged upstream of and at least partially overlaps the non-overlapping region of the first charge-air cooler part.

4. A heat exchanger arrangement according to claim 3, wherein the first charge-air cooler part and the second charge-air cooler part are connected in series by connecting lines.

5. A heat exchanger arrangement according to claim 4, wherein the second charge-air cooler part is positioned parallel to the coolant cooler in the direction of air flow.

6. A heat exchanger arrangement according to claim 5, wherein the second charge-air cooler part extends only in the non-overlapping region of the first charge-air cooler part.

* * * * *